United States Patent
Crawford et al.

(10) Patent No.: US 11,372,895 B2
(45) Date of Patent: Jun. 28, 2022

(54) SKETCHING USING A HYBRID QUANTUM-CLASSICAL SYSTEM

(71) Applicant: International Business Machines Corporation, Armonk, NY (US)

(72) Inventors: Catherine H. Crawford, Bedford, NH (US); Lior Horesh, North Salem, NY (US); Tal Kachman, Haifa (IL); John A. Gunnels, Somers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 16/371,904

(22) Filed: Apr. 1, 2019

(65) Prior Publication Data
US 2020/0311107 A1  Oct. 1, 2020

(51) Int. Cl.
| | |
|---|---|
| *G06F 16/00* | (2019.01) |
| *G06N 10/00* | (2022.01) |
| *G06N 20/00* | (2019.01) |
| *G06F 16/28* | (2019.01) |
| *G06F 16/906* | (2019.01) |
| *G06N 20/10* | (2019.01) |

(52) U.S. Cl.
CPC .......... *G06F 16/285* (2019.01); *G06F 16/906* (2019.01); *G06N 10/00* (2019.01); *G06N 20/10* (2019.01)

(58) Field of Classification Search
CPC ...... G06F 16/285; G06F 16/35; G06F 16/906; G06N 10/00; G06N 20/10
USPC ........................................................ 707/737
See application file for complete search history.

(56) References Cited

U.S. PATENT DOCUMENTS

| | | | |
|---|---|---|---|
| 8,463,784 B1 * | 6/2013 | Bekkerman et al. | G06K 9/6219 707/737 |
| 9,306,739 B1 | 4/2016 | Troupe | |
| 9,665,832 B2 * | 5/2017 | Thieberger | G06N 5/04 |
| 9,881,256 B2 | 1/2018 | Hamze et al. | |
| (Continued) | | | |

FOREIGN PATENT DOCUMENTS

| | | | | |
|---|---|---|---|---|
| CN | 108399267 A | * | 8/2018 | ........... G06F 16/285 |
| CN | 109034238 A | * | 12/2018 | ........... G06K 9/6218 |

OTHER PUBLICATIONS

Potok et al. "A Study of Complex Deep Learning Networks on High-Performance, Neuromorphic, and Quantum Computers." ACM Journal on Emerging Technologies in Computing Systems (JETC) 14.2 (2018): 19. (Background).

(Continued)

*Primary Examiner* — Irete F Ehichioya
*Assistant Examiner* — Shirley D Hicks
(74) *Attorney, Agent, or Firm* — Garg Law Firm, PLLC; Rakesh Garg; Joseph Petrokaitis

(57) ABSTRACT

In an embodiment, a method of sketching using a hybrid quantum-classical system includes creating a set of clustered data sets from a first data set. In an embodiment, the method includes evaluating, using a quantum processor and quantum memory, the set of clustered data sets. In an embodiment, the method includes evaluating, using the quantum processor and quantum memory, a set of quality metrics for the set of clustered data sets. In an embodiment, the method includes reclustering, responsive to at least one of the set of quality metrics failing to meet a quality criterion, the first data set.

16 Claims, 7 Drawing Sheets

(56) References Cited

U.S. PATENT DOCUMENTS

| | | | | |
|---|---|---|---|---|
| 2011/0208737 A1* | 8/2011 | Shmueli | ............... | G06F 16/285 |
| | | | | 707/737 |
| 2015/0046457 A1* | 2/2015 | Weinstein | ............ | G06F 16/287 |
| | | | | 707/737 |
| 2016/0110362 A1* | 4/2016 | Khurana et al. | ...... | G06F 16/248 |
| | | | | 707/722 |
| 2016/0314406 A1* | 10/2016 | Wiebe | .................... | G06N 10/00 |
| 2016/0328253 A1 | 11/2016 | Majumdar | | |
| 2020/0234172 A1* | 7/2020 | King | ...................... | G06N 5/003 |

OTHER PUBLICATIONS

Higgins et al. "Entanglement-free Heisenberg-limited phase estimation." Nature 450.7168 (2007): 393. (Background).

Li et al. "Quantum annealing versus classical machine learning applied to a simplified computational biology problem." NPJ quantum information 4.1 (2018): 14. (Related).

Liu et al. "Adiabatic Quantum Computation Applied to Deep Learning Networks." Entropy 20.5 (2018): 380. (Related).

Nodehi et al., "A Distributed Quantum Evolutionary Algorithm With Anew Cycling Operator and Its Application in Fractal Image Compression." International Journal of Artificial Intelligence & Applications (IJAIA), vol. 3, No. 1, Jan. 2012 (Background).

\* cited by examiner

SKETCHING USING A HYBRID QUANTUM-CLASSICAL SYSTEM

TECHNICAL FIELD

The present invention relates generally to data sample selection. More particularly, the present invention relates to sketching using a hybrid quantum-classical system.

BACKGROUND

Hereinafter, a "Q" prefix in a word or phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we commonly use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented by 1 and 0.

A quantum processor (q-processor) uses the unique nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 inference between possible outcomes for an event. Entanglement means that qubits in a superposition can be correlated with each other in a non-classical way; that is, the state of one (whether it is a 1 or a 0 or both) can depend on the state of another, and that there is more information contained within the two qubits when they are entangled than as two individual qubits.

Using these two principles, qubits operate as processors of information, enabling quantum computers to function in ways that allow them to solve certain difficult problems that are intractable using conventional computers.

A class of problems exists called optimization problems. An optimization problem is a computational problem in which the best or optimal solution is to be determined for a different problem where the different problem has several possible solutions. For example, the different problem can be the famous traveling salesman problem where a route has to be determined between several cities such that a traveling salesman covers each of the cities without revising any of the cities. This problem has many possible solutions—routes between the cities. An optimization problem related to the traveling salesman problem is to find the shortest—i.e., the best or most optimal route—from the many possible routes, each of which satisfies the requirements of the traveling salesman problem.

Configuring an optimization problem for execution on a computer so that the computer can compute the optimal solution in finite time is a difficult problem in itself. Until recently, the only computing resources available for executing optimization problems were the conventional computers as described herein. Many optimization problems are too difficult or too complex for conventional computers to compute in finite time with reasonable resources. Generally, an approximated solution which can be computed in reasonable time and with reasonable resources is accepted as the near-optimal solution in such cases.

The advent of quantum computing has presented advancement possibilities in many areas of computing, including the computation of optimization problems. Because a quantum computing system can evaluate many solutions from the solution space at once, the illustrative embodiments recognize that such systems are particularly suitable for solving optimization problems.

In machine learning, a supervised learning model classifies data into categories. Typically, a set of training examples are each marked as belonging to a category, and a training algorithm builds a model that assigns new examples to a particular category The illustrative embodiment recognizes that a quantum decision making system, such as a quantum classifier, a quantum regressor, a quantum controller or a quantum predictor, may be used to analyze input data and make a decision regarding the input data by a quantum classifier. For example, a quantum classifier, such as a quantum support vector machine (QSVM), may be used to analyze input data and determine a discrete classification of the input data by a quantum processor. In other examples, regressors, controllers, or predictors may operate on continuous space entities. A quantum classifier, such as a QSVM, implements a classifier using a quantum processor which has the capability to increase the speed of classification of certain input data. The illustrative embodiments recognize that training a quantum classifier and other quantum decision making systems typically require a large sample of input data.

The illustrative embodiments recognize that conventional classifiers may be inefficient for training with large data sets. The illustrative embodiments further recognize that smaller, representative data sets can more efficiently train conventional classifiers. The illustrative embodiments further recognize that presently available methods cluster large data sets into smaller clusters and subsample from these representative clusters to minimize the training data set. This process is known as sketching.

Objects in a data set can be clustered using a number of different techniques. Physics-based clustering is a set of clustering techniques based on physical properties of a set of data objects. Physics-based clustering includes centroid-based clustering, connectivity-based clustering, and entropy-based clustering. Connectivity-based clustering groups objects based on the idea that objects in a data set are more related to nearby objects than to objects farther away. Distance functions connect objects to form clusters based on their distance. Clusters in connectivity-based clustering are described by the maximum distance needed to connect parts of the cluster.

Another technique for clustering objects in a data set is centroid-based clustering. Centroid-based clustering involves a central vector which represents each cluster. A number of central vectors may be specified for the data set and the clustering algorithm then groups objects to the nearest cluster center to minimize distances.

Entropy-based clustering seeks to minimize the entropy of each cluster, or reduce the total amount of disorder. Entropy is a measure of the amount of disorder in a set of objects.

The illustrative embodiments further recognize that clusters should accurately represent the larger, original training data set. The illustrative embodiments recognize that clustering can yield different size clusters. The illustrative embodiments further recognize that subsampling from larger clusters to create uniform cluster sizes can introduce bias into the subsampled training data set.

SUMMARY

The illustrative embodiments provide a method, system, and computer program product for sketching using a hybrid quantum-classical system. In an embodiment, a method includes creating a set of clustered data sets from a first data set. In an embodiment, a method includes evaluating, using a quantum processor and quantum memory, the set of clustered data sets. In an embodiment, a method includes evaluating, using the quantum processor and quantum memory, a set of quality metrics for the set of clustered data sets. In an embodiment, a method includes reclustering, responsive to at least one of the set of quality metrics failing to meet a quality criterion, the first data set.

In an embodiment, the set of clustered data sets is created using a physics-based clustering. In an embodiment, the quality metric is an entropy of the corresponding clustered data set. In an embodiment, a method includes comparing the set of quality metrics to the quality criterion, wherein the quality criterion is an extremum.

In an embodiment, a method includes evaluating, using the quantum processor and quantum memory, a set of reclustered data sets from the first data set. In an embodiment, a method includes generating a second set of quality metrics for the set of reclustered data sets. In an embodiment, a method includes reclustering, responsive to at least one of the second set of quality metrics failing to meet a second quality criterion, the first data set.

An embodiment includes a computer usable program product. The computer usable program product includes a computer-readable storage device, and program instructions stored on the storage device.

In an embodiment, the program instructions are stored in a computer readable storage device in a data processing system, and wherein the computer usable code is transferred over a network from a remote data processing system. In an embodiment, the program instructions are stored in a computer readable storage device in a server data processing system, and wherein the computer usable code is downloaded over a network to a remote data processing system for use in a computer readable storage device associated with the remote data processing system.

An embodiment includes a computer system. The computer system includes a quantum processor, a computer-readable memory, and a computer-readable storage device, and program instructions stored on the storage device for execution by the quantum processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
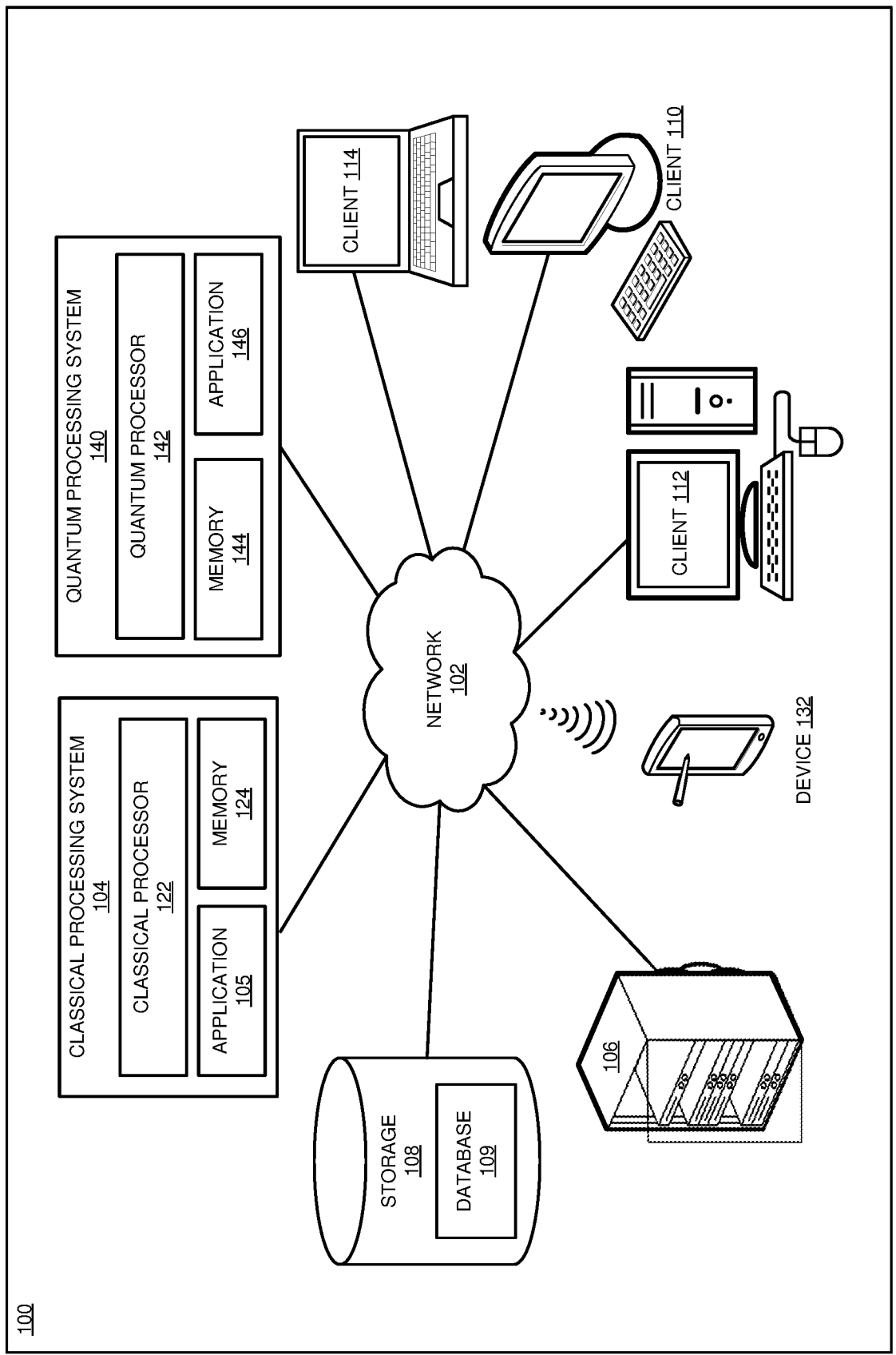
FIG. 1 depicts a block diagram of a network of data processing systems in which illustrative embodiments may be implemented.

The illustrative embodiments used to describe the invention generally address and solve the above-described problem of solving computational problems using quantum computing. The illustrative embodiments provide a method and system for sketching using a hybrid classical-quantum computing system.

An embodiment provides a method for improving classification of data using hybrid classical-quantum computing system. Another embodiment provides a conventional or quantum computer usable program product comprising a computer-readable storage device, and program instructions stored on the storage device, the stored program instructions comprising a method for enhancing classification of data using hybrid classical-quantum computing system. The instructions are executable using a conventional or quantum processor. Another embodiment provides a computer system comprising a conventional or quantum processor, a computer-readable memory, and a computer-readable storage device, and program instructions stored on the storage device for execution by the processor via the memory, the stored program instructions comprising a method for enhancing classification of data using hybrid classical-quantum computing system.

One or more embodiments provide for a mixed classical and quantum methodology that enhances classical clustering functions. In one or more embodiments, a classical computer is used to store a large data set associated with classification training data and cluster into a training data set into a set of clusters, and a quantum computer is used to simultaneously evaluate the clusters.

In an embodiment, the classical computer uses the evaluations of the quantum computer to reconfigure the clustering function. In an embodiment, the classical computer uses the evaluations of the quantum computer to update a quality metric.

In an embodiment, the classical computer sends a data set to the quantum computer to be evaluated. In the embodiment, the quantum computer scores the data set and produces a quality metric. In the embodiment, the quality metric and the data set are returned to the classical computer. In the embodiment, the classical computer reconfigures the clustering algorithm according to the quality metric.

In an embodiment, the classical computer sends a plurality of data sets to the quantum computer to be evaluated. In an embodiment, the quantum computer scores the plurality of data sets and produces a plurality of quality metrics corresponding to the plurality of data sets. In an embodiment, the plurality of quality metrics are compared to a threshold quality criterion. For example, the threshold quality criterion can be a minimum quality. In an embodiment, a subset of the plurality of data sets are determined to be of at least a minimum quality. In the embodiment, the subset of the plurality of data sets are returned to the classical computer. In the embodiment, the classical computer reconfigures the clustering algorithm according to a subset of the plurality of quality metrics corresponding to the subset of data sets.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for using a variety of components that can be purposed or repurposed to provide a described function within a data processing environment, and such adaptations are contemplated within the scope of the illustrative embodiments.

The illustrative embodiments are described with respect to certain types of steps, applications, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
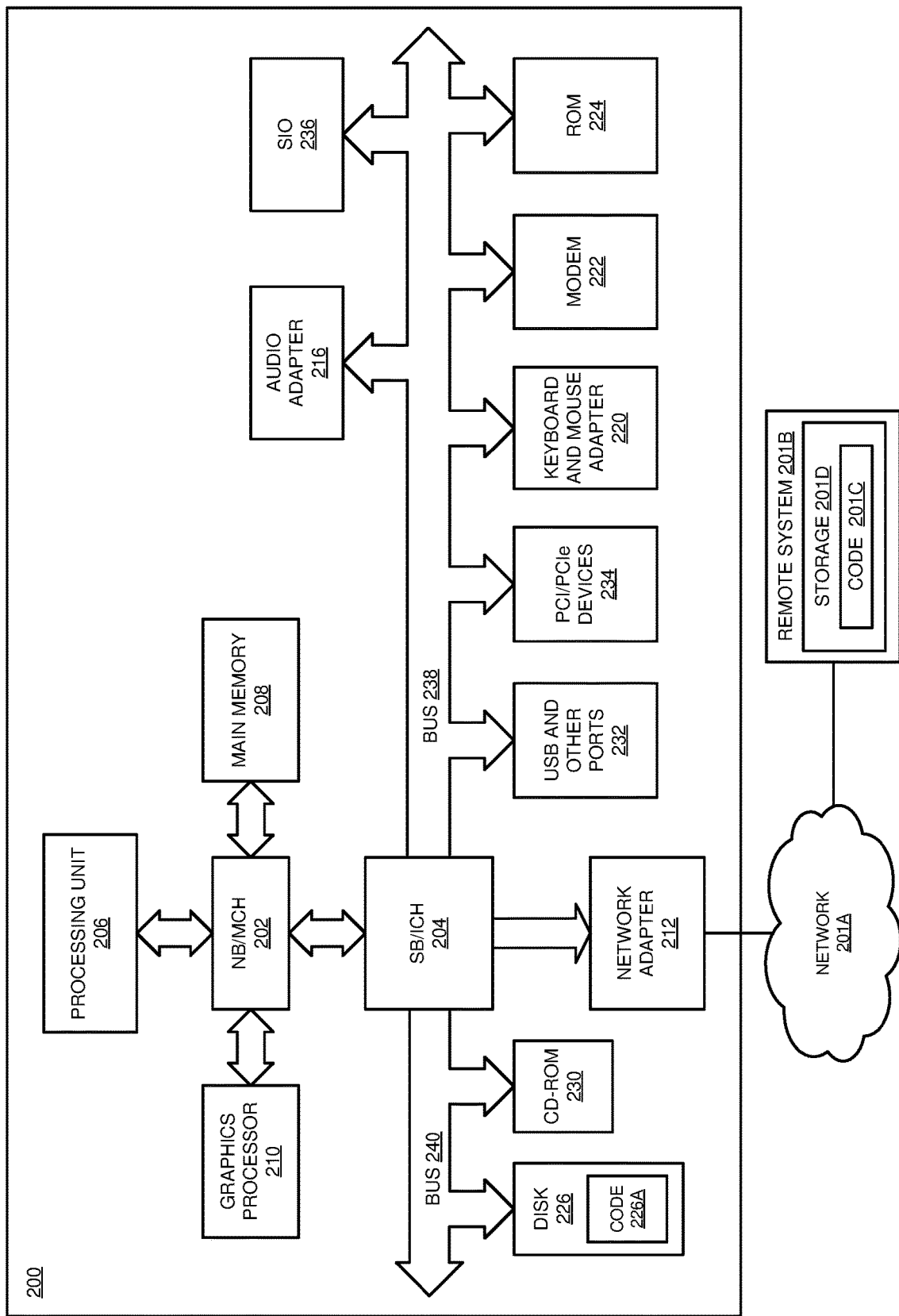
FIG. 2 depicts a block diagram of a conventional data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Cloud 140 is an example of a QCE described herein. As an example, QCE 140 includes CCN 104, 106, and many other similar CCNs 142. As an example, CCNs 106 and 142 may be configured as cluster 144 of CCNs. QCE 140 further includes one or more QCCNs, such as QCCN 146. A QCCN, such as QCCN 146, comprises one or more q-processors 148. A currently viable qubit is an example of q-processor 148. Application 105 implements an embodiment described herein. Application 105 operates on a CCN, such as server 104 in QCE 140. Client 110 may configure job 111 and operate as a sender of job 111 to QCE 140 in a manner described herein.

QCE 140 may couple to network 102 using wired connections, wireless communication protocols, or other suitable data connectivity. Clients 110, 112, and 114 may be, for example, personal computers or network computers. Network 102 may represent a collection of networks and gateways that use the Transmission Control Protocol/Internet Protocol (TCP/IP) and other protocols to communicate with one another. FIG. 1 is intended as an example, and not as an architectural limitation for the different illustrative embodiments.

Data processing environment 100 as a whole may also take the form of a cloud, and employ a cloud computing model of service delivery for enabling convenient, ondemand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a conventional data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
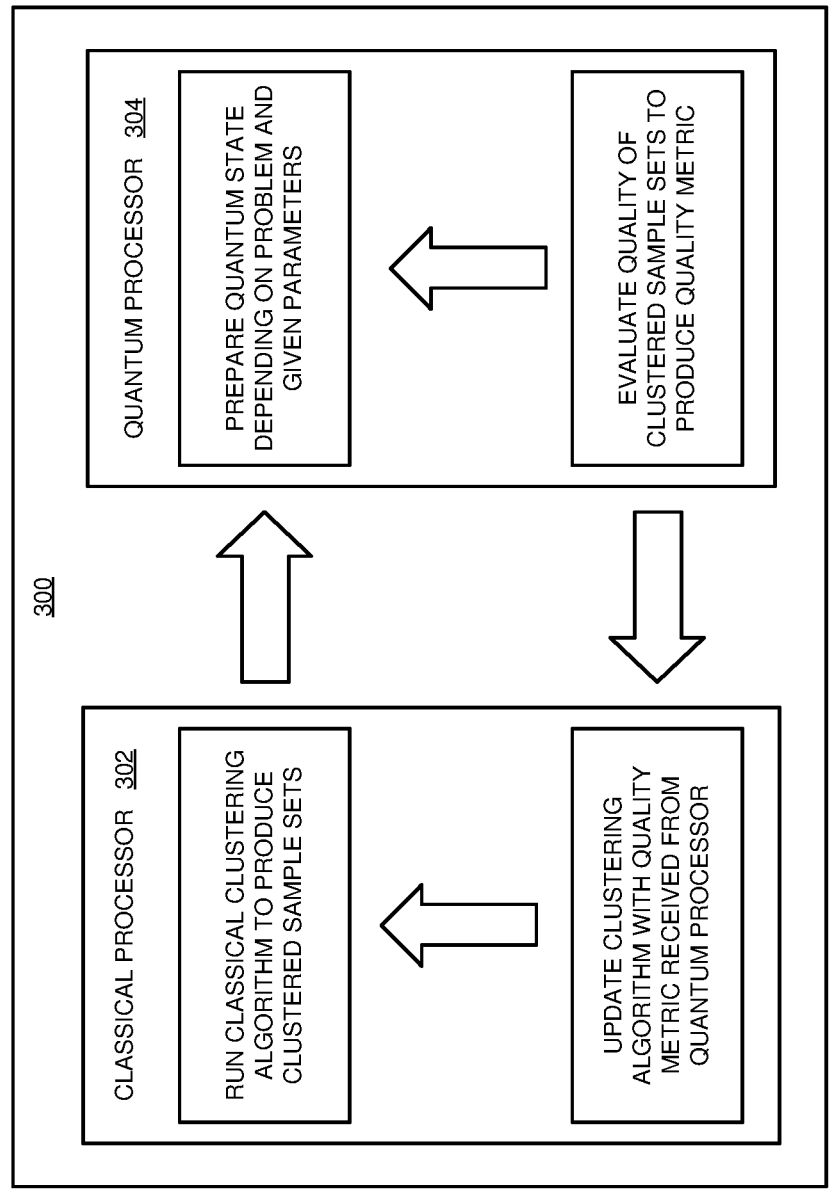
FIG. 3 depicts a block diagram of an example hybrid quantum/classical optimization algorithm in accordance with an illustrative embodiment.

With reference to FIG. 3, this figure depicts a block diagram of an example hybrid quantum/classical optimization algorithm 300 for enhancing clustering algorithms using a classical processor 302 and a quantum processor 304. In the example, classical processor 302 runs a classical clustering algorithm to generate clustered sample sets and sends the clustered sample sets to quantum processor 304.

Quantum processor 304 prepares a quantum state depending on the particular combinatorial problem to be solved and the given update parameters. Quantum processor 304 executes the prepared quantum state and measures the quantum state a multiple number of times to sample from the solution space to generate samples and evaluate the clustered sample sets to produce quality metrics. Classical processor 302 receives the quality metrics from quantum processor 304 and evaluates the received samples quality metrics to determine if the parameters for the classical clustering algorithm are to be updated.

If classical processor 302 determines that the parameters for the clustering algorithm are to be updated, classical processor 302 runs the clustering algorithm using the updated parameters to generate further clustered sample sets. Classical processor 302 then sends the further clustered sample sets to quantum processor 304. Typically, the process is repeated until convergence within an acceptable threshold is obtained.

Figure 4:
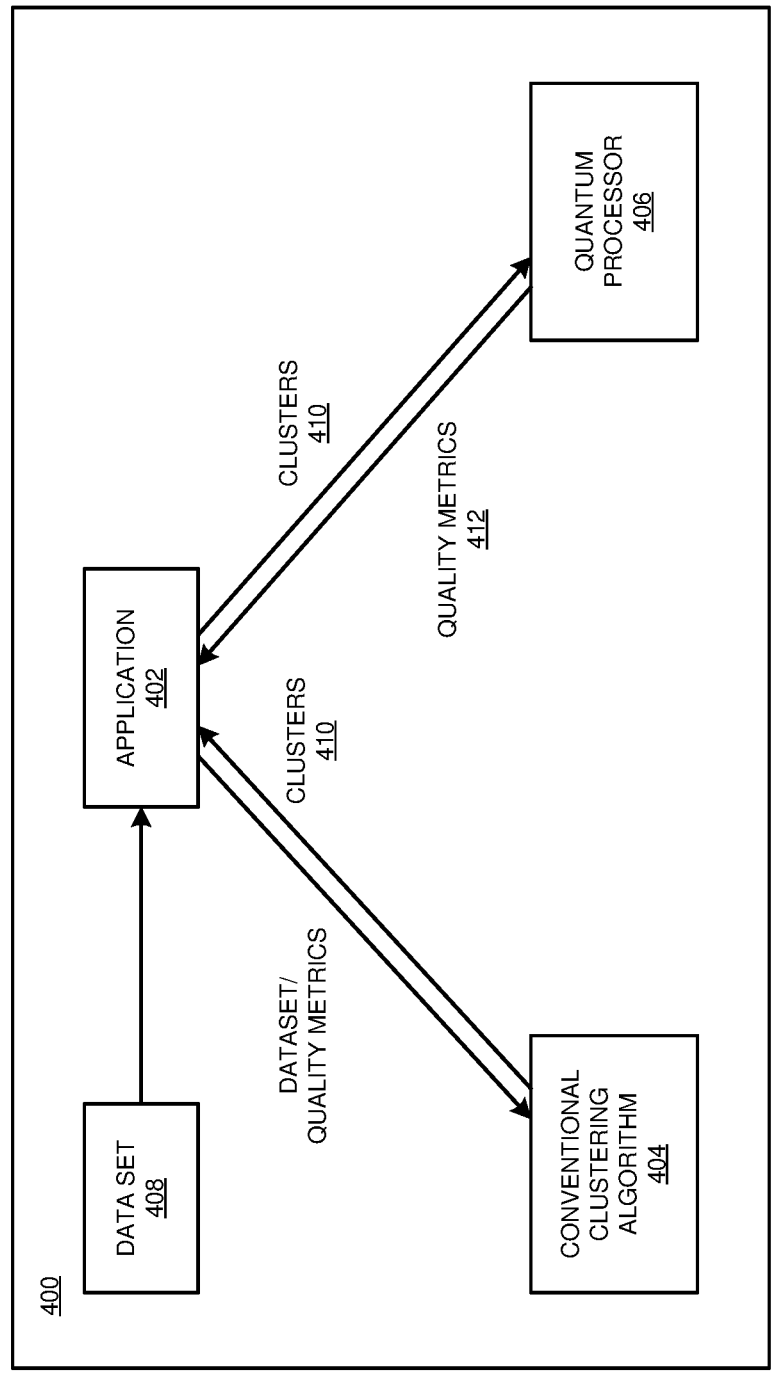
FIG. 4 depicts a block diagram of an example configuration in accordance with an illustrative embodiment.

With reference to FIG. 4, this figure depicts a block diagram of an example configuration 400 in accordance with an illustrative embodiment. The example embodiment includes an application 402. In a particular embodiment, application 402 is an example of application 105 of FIG. 1.

Application 402 receives a data set 408. In an embodiment, application 402 provides data set 408 to a conventional clustering algorithm 404 for clustering. Conventional clustering algorithm 404 clusters data set 408 into a set of clustered data sets 410 according to a clustering criterion. For example, conventional clustering algorithm 404 can analyze the data set using centroid-based clustering.

Application 402 receives the set of clustered data sets 410 from the conventional clustering algorithm 404. In an embodiment, application 402 provides the set of clustered data sets 410 to quantum processor 406 for quality analysis of the set of clustered data sets 410. In an embodiment, quantum processor 406 generates a quality metric for each clustered data set in the set of clustered data sets 410.

In an embodiment, application 402 receives the set of quality metrics 412 generated in the quality analysis. In an embodiment, application 402 analyzes the set of quality metrics and the corresponding clustered data set. In an embodiment, application 402 provides the set of quality metrics corresponding to the set of clustered data sets to the conventional clustering algorithm 404. In an embodiment, conventional clustering algorithm 404 reclusters the data set 408 in response to a quality metric corresponding to one of the clustered data sets failing to meet a threshold quality criterion.

Figure 5:
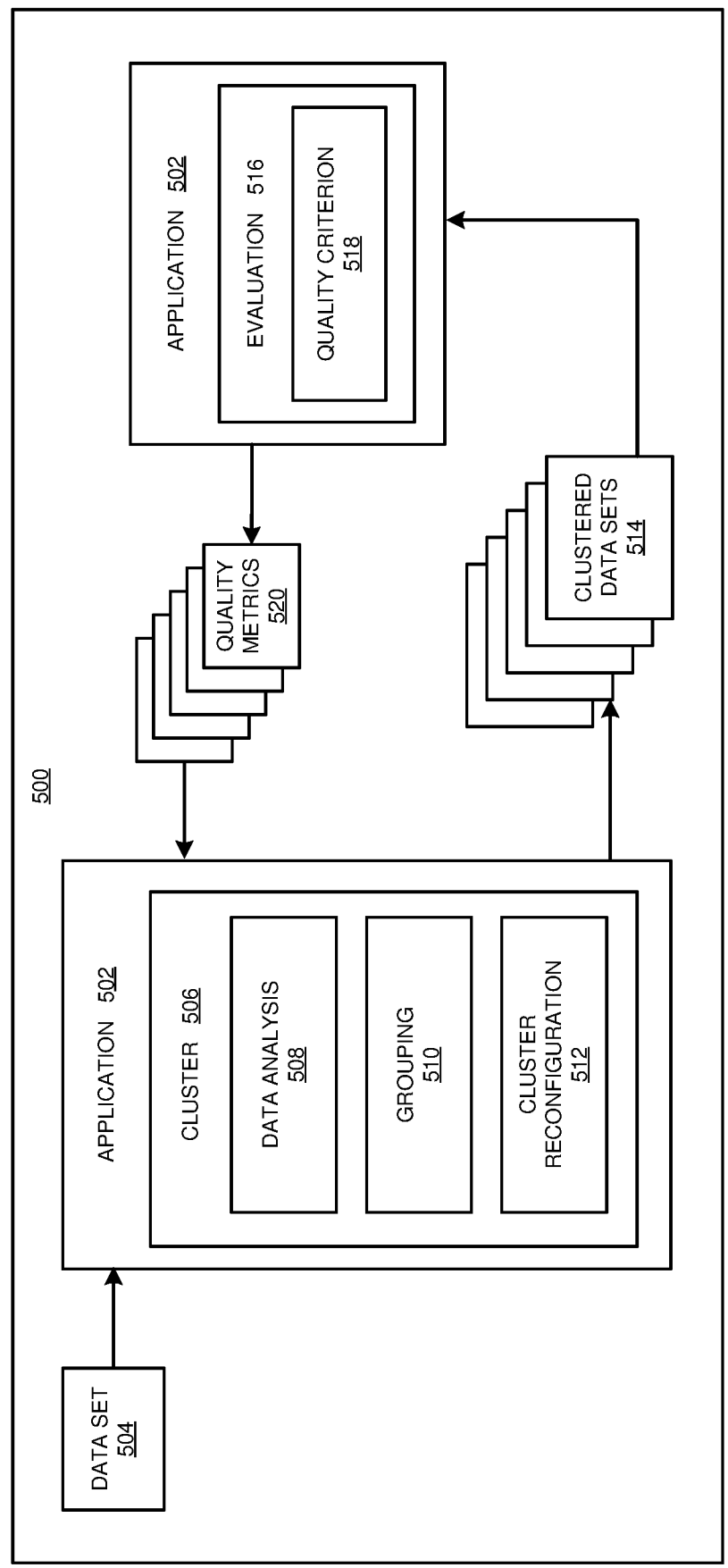
FIG. 5 depicts a block diagram of an example configuration in accordance with an illustrative embodiment.

With reference to FIG. 5, this figure depicts a block diagram of an example configuration 500 in accordance with an illustrative embodiment. The example embodiment includes an application 502. In a particular embodiment, application 502 is an example of application 105 of FIG. 1.

Application 502 receives a data set 504. In an embodiment, application 502 includes cluster component 506. Cluster component 506 clusters data set 504 into a set of clustered data sets 514. In an embodiment, cluster component 506 executes on a conventional processor with a conventional memory. Data analysis component 508 analyzes items in the data set 504 according to a clustering criterion. For example, data analysis component can analyze items in data set 504 according to a centroid-based clustering criterion. Grouping component 510 groups items in data set 504 into a plurality of clustered data sets.

In an embodiment, application 502 includes evaluation component 516. In an embodiment, evaluation component 516 executes on a quantum processor with a quantum memory. Evaluation component 516 evaluates the set of clustered data sets 514 to produce a quality metric corresponding to each of the clustered data sets. Evaluation component 516 evaluates the set of clustered data sets 514 according to a quality criterion 518. For example, evaluation component 516 can determine an entropy of each individual clustered data set.

In an embodiment, evaluation component 516 compares each quality metric in the set of quality metrics to a quality criterion. For example, the quality criterion can be a threshold (extrema, minima, or maxima) amount. For example, the quality criterion can be a maximum entropy amount. In an embodiment, evaluation component 516 determines at least one of the set of clustered data sets fails to meet the quality criterion.

In an embodiment, evaluation component 516 determines any clustered data set failing to meet the quality criterion is to be reclustered. In another embodiment, evaluation component 516 determines any clustered data set failing to meet the quality criterion is not returned to the conventional processor. In an embodiment, evaluation component 516 determines any clustered data set meeting the quality criterion is returned to the cluster component 506.

In an embodiment, cluster component 506 receives the subset of the set of quality metrics 520 corresponding to the subset of the set of clustered data sets 514 meeting the quality criterion. In another embodiment, cluster component 506 receives the set of quality metrics 520 corresponding to the set of clustered data sets 514. Cluster reconfiguration component 512 determines at least one of the set of clustered data sets fails to meet the quality criterion. In an embodiment, cluster reconfiguration component 512 evaluates the subset of the set of clustered data sets meeting the quality criterion. In an embodiment, cluster component 506 reclusters data set 504 according to the subset of the set of clustered data sets.

Figure 6:
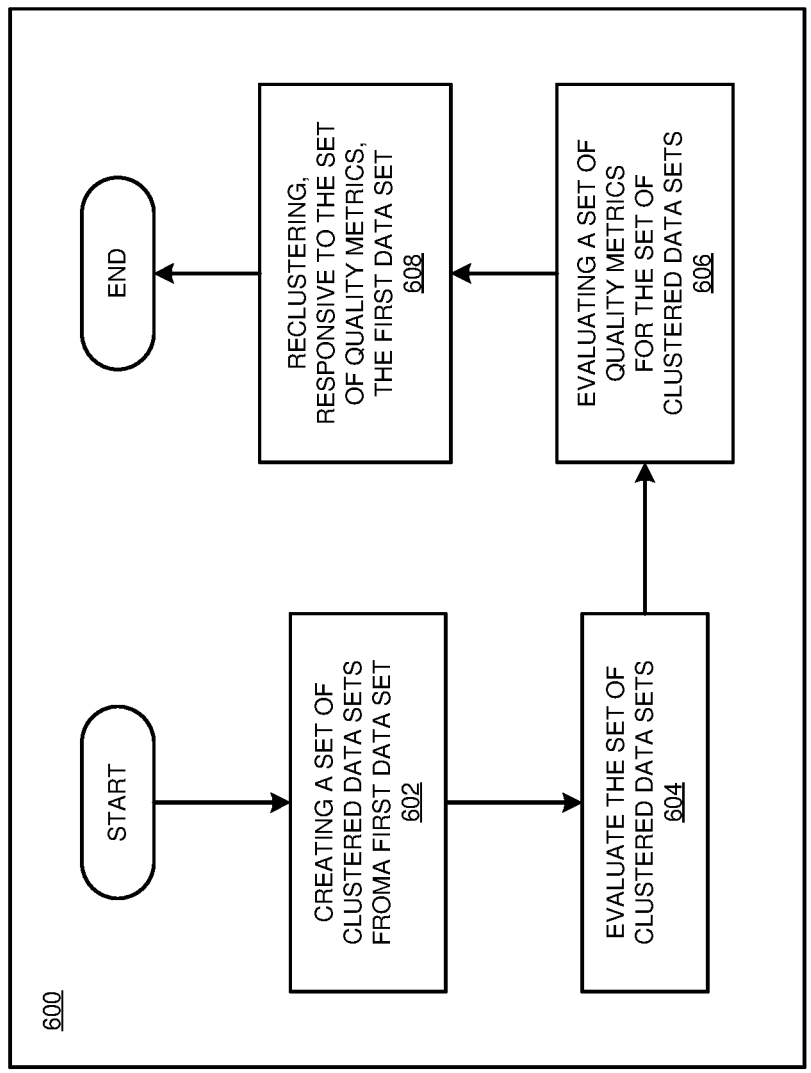
FIG. 6 depicts a flowchart of an example process in accordance with an illustrative embodiment.

With reference to FIG. 6, this figure depicts a flowchart of an example process in accordance with an illustrative embodiment. In a particular embodiment, application 502 carries out the steps of process 600. At block 602, application 502 creates a set of clustered data sets from a first data set. In an embodiment, application 502 creates the set of clustered data sets using a conventional clustering algorithm executing on a conventional processor with a conventional memory.

In an embodiment, at block 604 application 502 evaluates the set of clustered data sets according to a quality criterion. For example, application 502 can evaluate each of the set of clustered data sets to determine an entropy of each individual clustered data set. In an embodiment, application 502 evaluates the set of clustered data sets using a quantum processor with a quantum memory.

In an embodiment, at block 606 application 502 evaluates a set of quality metrics corresponding to the set of clustered data sets. For example, each of the set of clustered data sets includes a corresponding quality metric. In an embodiment, at block 608 application 502 reclusters the first data set. For example, application 502 can determine at least one of the set of quality metrics fails to meet a quality criterion. For example, the quality criterion can be a threshold (minima or maxima) amount. In an embodiment, process 600 can return to block 604 to evaluate the set of reclustered data sets. Process 600 can continue in this manner until each quality metric meets the quality criterion. Process 600 ends thereafter.

Figure 7:
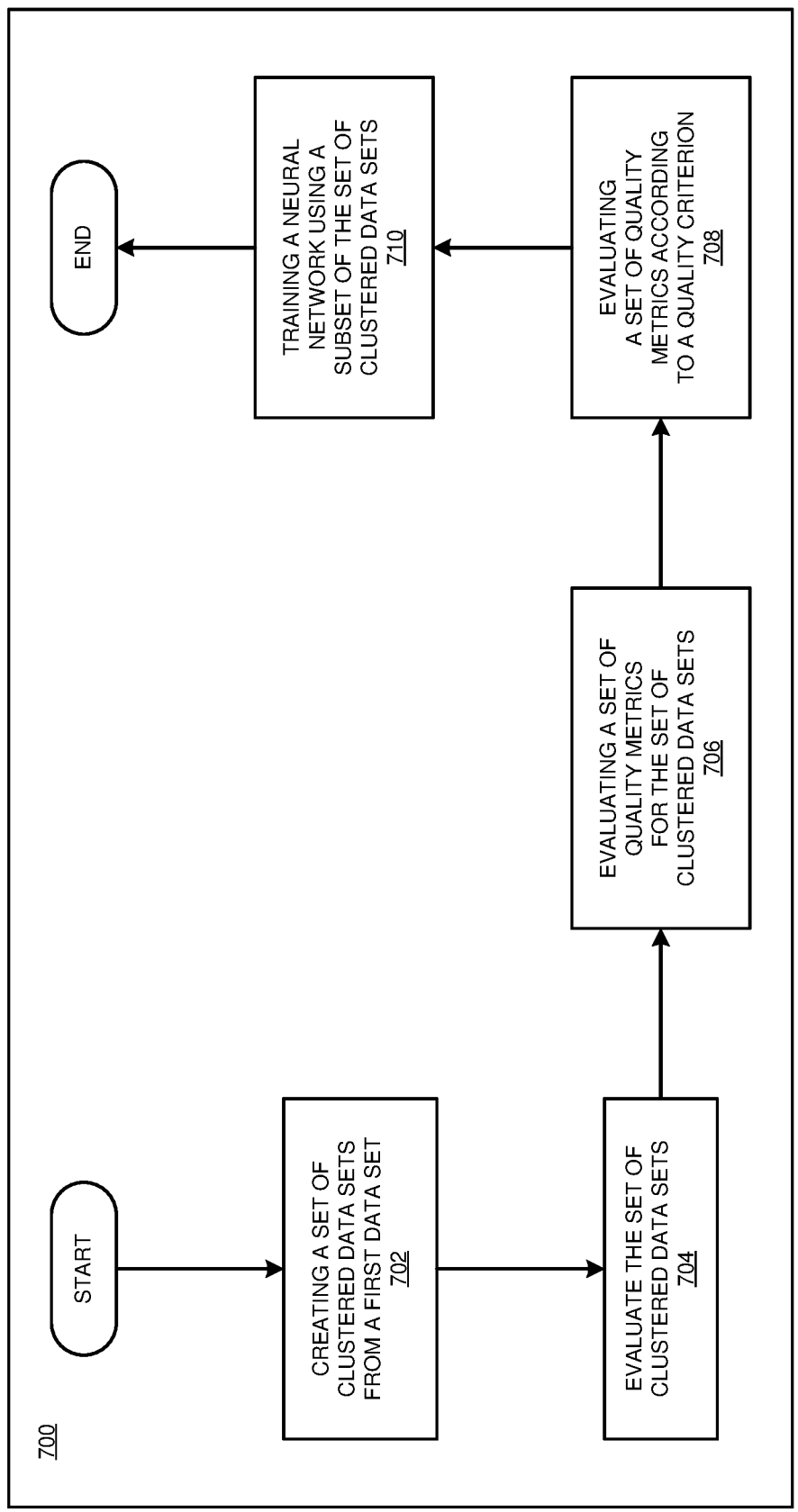
FIG. 7 depicts a flowchart of an example process in accordance with an illustrative embodiment.

With reference to FIG. 7, this figure depicts a flowchart of an example process in accordance with an illustrative embodiment. In a particular embodiment, application 502 carries out the steps of process 700. At block 702, application 502 creates a set of clustered data sets from a first data set. In an embodiment, application 502 creates the set of clustered data sets using a conventional clustering algorithm executing on a conventional processor with a conventional memory.

In an embodiment, at block 704 application 502 evaluates the set of clustered data sets according to a quality criterion. For example, application 502 can evaluate each of the set of clustered data sets to determine an entropy of each individual clustered data set. In an embodiment, application 502 evaluates the set of clustered data sets using a quantum processor with a quantum memory.

In an embodiment, at block 706 application 502 evaluates a set of quality metrics corresponding to the set of clustered data sets. For example, each of the set of clustered data sets includes a corresponding quality metric. In an embodiment, at block 708 application 502 evaluates the set of quality metrics according to a quality criterion. For example, application 502 can determine at least one of the set of quality metrics fails to meet a quality criterion. For example, the quality criterion can be a threshold (minima or maxima) amount. In an embodiment, at block 710 application 502 trains a neural network using a subset of the set of clustered data sets, the subset of the set of clustered data sets each including quality metrics meeting the quality criterion. Process 700 ends thereafter.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
 configuring, within a computing environment, a conventional processor coupled to a conventional memory and a quantum processor, wherein the conventional processor is configured to execute a clustering algorithm and the quantum processor is configured to determine an entropy of a data set;

creating, using the conventional processor and the conventional memory according to a clustering criterion, a set of clustered data sets from a first data set;

determining, using the quantum processor, an entropy of each of the set of clustered data sets;

removing, from the set of clustered data sets, a clustered data set having an entropy greater than a maximum entropy amount, the removing creating a modified set of clustered data sets;

returning, to the conventional processor, the modified set of clustered data sets; and reclustering, using the conventional processor and the conventional memory, the modified set of clustered data sets, the reclustering creating a reclustered modified set of clustered data sets; and training, using a subset of the reclustered modified set of clustered data sets, a neural network, each data set in the subset having an entropy less than or equal to the maximum entropy amount.

2. The method of claim 1, wherein the set of clustered data sets is created using a physics-based clustering.

3. The method of claim 1, further comprising:
comparing the entropy to the maximum entropy amount.

4. The method of claim 1, further comprising:
determining, using the quantum processor, an entropy of a set of reclustered data sets from the first data set.

5. The method of claim 4, further comprising:
reclustering, responsive to at least one of the entropy of the set of reclustered data sets being greater than the maximum entropy amount, the first data set.

6. A computer usable program product comprising a computer-readable storage medium storing a program code which, when executed, causes a performance of a procedure comprising:

configuring, within a computing environment, a conventional processor coupled to a conventional memory and a quantum processor, wherein the conventional processor is configured to execute a clustering algorithm and the quantum processor is configured to determine an entropy of a data set;

creating, using the conventional processor and the conventional memory according to a clustering criterion, a set of clustered data sets from a first data set;

determining, using the quantum processor, an entropy of each of the set of clustered data sets;

removing, from the set of clustered data sets, a clustered data set having an entropy greater than a maximum entropy amount, the removing creating a modified set of clustered data sets;

returning, to the conventional processor, the modified set of clustered data sets; and reclustering, using the conventional processor and the conventional memory, the modified set of clustered data sets, the reclustering creating a reclustered modified set of clustered data sets; and training, using a subset of the reclustered modified set of clustered data sets, a neural network, each data set in the subset having an entropy less than or equal to the maximum entropy amount.

7. The computer usable program product of claim 6, further comprising:
storing the program code in the computer readable storage medium in a data processing system, and transferring the program code over a network from a remote data processing system.

8. The computer usable program product of claim 6, further comprising:
storing the program code in the computer readable storage medium in a server data processing system, and wherein the program code is downloaded over a network to a remote data processing system for use in another computer readable storage medium associated with the remote data processing system.

9. The computer usable program product of claim 6, further comprising:
creating the set of clustered data sets using a physics-based clustering.

10. The computer usable program product of claim 6, further comprising:
comparing the entropy to the maximum entropy amount.

11. The computer usable program product of claim 6, further comprising:
determining, using the quantum processor, an entropy of a set of reclustered data sets from the first data set.

12. The computer usable program product of claim 11, further comprising:
reclustering, responsive to at least one of the entropy of the set of reclustered data sets being greater than the maximum entropy amount, the first data set.

13. A computer system comprising:
a quantum processor;
a computer-readable memory;
and a computer-readable storage medium, storing a program code, an execution of the program code causing a performance of a procedure, the procedure comprising:

configuring, within a computing environment, a conventional processor coupled to a conventional memory and a quantum processor, wherein the conventional processor is configured to execute a clustering algorithm and the quantum processor is configured to determine an entropy of a data set;

creating, using the conventional processor and the conventional memory according to a clustering criterion, a set of clustered data sets from a first data set;

determining, using the quantum processor, an entropy of each of the set of clustered data sets;

removing, from the set of clustered data sets, a clustered data set having an entropy greater than a maximum entropy amount, the removing creating a modified set of clustered data sets;

returning, to the conventional processor, the modified set of clustered data sets; and reclustering, using the conventional processor and the conventional memory, the modified set of clustered data sets, the reclustering creating a reclustered modified set of clustered data sets; and training, using a subset of the reclustered modified set of clustered data sets, a neural network, each data set in the subset having an entropy less than or equal to the maximum entropy amount.

14. The computer system of claim 13, wherein the set of clustered data sets is created using a physics-based clustering.

15. The computer system of claim 13, wherein the procedure further comprises comparing the entropy to the maximum entropy amount.

16. The method of claim 1, wherein the clustering criterion comprises a centroid-based clustering criterion.

\* \* \* \* \*